United States Patent
Kim et al.

(10) Patent No.: US 12,103,385 B2
(45) Date of Patent: Oct. 1, 2024

(54) ELECTRONIC PEDAL APPARATUS

(71) Applicants: Hyundai Motor Company, Seoul (KR); Kia Corporation, Seoul (KR); DONG HEE INDUSTRIAL CO., LTD., Ulsan (KR)

(72) Inventors: Eun Sik Kim, Gwangmyeong-Si (KR); Wi Sang Park, Hwaseong-Si (KR); Jae Hyun Cho, Suwon-Si (KR); Jung Min Lee, Busan (KR); Seong Ju Jo, Seoul (KR)

(73) Assignees: Hyundai Motor Company, Seoul (KR); Kia Corporation, Seoul (KR); Dong Hee Industrial Co, Ltd., Ulsan (KR)

( * ) Notice: Subject to any disclaimer, the term of this patent is extended or adjusted under 35 U.S.C. 154(b) by 0 days.

(21) Appl. No.: 18/117,937

(22) Filed: Mar. 6, 2023

(65) Prior Publication Data

US 2024/0116361 A1 Apr. 11, 2024

(30) Foreign Application Priority Data

Oct. 5, 2022 (KR) .................. 10-2022-0127036

(51) Int. Cl.
*B60K 26/02* (2006.01)
*B60T 7/04* (2006.01)
*G01L 5/22* (2006.01)

(52) U.S. Cl.
CPC .............. *B60K 26/02* (2013.01); *B60T 7/042* (2013.01); *G01L 5/225* (2013.01)

(58) Field of Classification Search
CPC ......... B60K 26/02; B60T 7/042; G01L 5/225; G05G 1/42
See application file for complete search history.

(56) References Cited

U.S. PATENT DOCUMENTS

| | | | | |
|---|---|---|---|---|
| 994,708 | A * | 6/1911 | Riecke .................. | G05G 1/405 74/561 |
| 1,344,466 | A * | 6/1920 | Whitney .................. | G05G 1/42 74/513 |
| 1,503,525 | A * | 8/1924 | Davis .................... | B60W 10/18 477/215 |
| 1,527,151 | A * | 2/1925 | Davis .................... | B60W 10/18 477/215 |
| 1,711,988 | A * | 5/1929 | Brochon ............... | B60W 10/18 477/214 |

(Continued)

FOREIGN PATENT DOCUMENTS

| | | |
|---|---|---|
| CN | 204567311 U | 8/2015 |
| JP | 2007-0276707 | 10/2007 |

(Continued)

*Primary Examiner* — Thomas C Diaz
(74) *Attorney, Agent, or Firm* — Morgan, Lewis & Bockius LLP (57) ABSTRACT

An electronic pedal apparatus includes a pad that rectilinearly moves and rotates along a pad guide while being kept in line contact with the pad guide including a shape of an arc when a driver operates the pad, an acceleration signal or a braking signal for a vehicle is generated by operation of the single pad, and a movement direction of the pad at the time of generating the acceleration signal is different from a movement direction of the pad at the time of generating the braking signal.

20 Claims, 10 Drawing Sheets

(56) References Cited

U.S. PATENT DOCUMENTS

| | | | | |
|---|---|---|---|---|
| 2,483,224 | A | * | 9/1949 | Narcovich ............ B60W 10/18 74/513 |
| 2006/0053957 | A1 | * | 3/2006 | Ewel ....................... F02D 11/02 74/560 |
| 2008/0149411 | A1 | | 6/2008 | Schlabach et al. |
| 2015/0277479 | A1 | | 10/2015 | Viethen et al. |
| 2019/0163226 | A1 | | 5/2019 | Kihara et al. |
| 2019/0220052 | A1 | | 7/2019 | Kihara et al. |

FOREIGN PATENT DOCUMENTS

| | | |
|---|---|---|
| KR | 10-1997-0015306 | 4/1997 |
| KR | 10-1030570 | 4/2011 |
| KR | 10-2018-0102001 | 9/2018 |
| KR | 10-2020-0070946 | 6/2020 |

\* cited by examiner

ELECTRONIC PEDAL APPARATUS

CROSS REFERENCE TO RELATED APPLICATION

The present application claims priority to Korean Patent Application No. 10-2022-0127036, filed Oct. 5, 2022, the entire contents of which is incorporated herein for all purposes by this reference.

BACKGROUND OF THE PRESENT DISCLOSURE

Field of the Present Disclosure

The present disclosure relates to a technology associated with an electronic pedal apparatus mounted in a vehicle and configured to generate an acceleration signal or a braking signal for a vehicle when a driver operates the electronic pedal apparatus.

Description of Related Art

An autonomous vehicle refers to a smart vehicle to which an autonomous driving technology is applied so that the vehicle autonomously arrives at a destination even though a driver does not directly manipulate a steering wheel, an accelerator pedal, and a brake pedal.

In a case in which an autonomous driving situation is universally implemented, the driver may select an autonomous driving mode in which the driver does not directly drive the vehicle and the vehicle autonomously travels to the destination.

It is necessary to enable the driver to take a rest comfortably with his feet extending in the autonomous driving mode. If pedals (an accelerator pedal and a brake pedal) positioned in a lower space of a driver seat are kept exposed to the interior of the vehicle, the pedals disturb the driver's relaxation. When a pad of a pedal device is erroneously operated regardless of the driver's intention, there is a risk that an accident occurs.

Therefore, a foldable pedal device for an autonomous vehicle is being developed, in which a pedal pad is exposed to protrude toward the driver so that the driver may operate the pad in the manual driving mode in which the driver directly drives the vehicle, and the pedal pad is hidden so as not to protrude toward the driver in the autonomous driving mode so that the pad cannot be operated by the driver, ensuring the driver's comfortable relaxation and implementing safety by preventing an erroneous operation.

However, the foldable pedal device has a drawback in that it is necessary to provide a space for hiding the pedal device in a hidden state, and an operation mechanism is also complicated.

To solve the above-mentioned problems, a technology related to a pressure-operating pedal apparatus is being developed.

The pressure-operating pedal apparatus requires a very small operating displacement of a pedal and has a simple operation mechanism. Furthermore, the pressure-operating pedal apparatus does not require a mechanical configuration related to a foldable function, which provides an advantageous effect of innovatively improving an indoor space of an autonomous driving vehicle.

However, in the case of the pressure-operating pedal apparatus, because the operating displacement of the pedal is very small, it is difficult for a driver to easily recognize a degree to which the driver operates the pedal. Furthermore, the pressure-operating pedal apparatus is operated only by force applied by the driver, the driver's fatigue increases when the driver operates the pressure-operating pedal apparatus over a long time period.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic pedal apparatus mounted in a vehicle and configured to generate an acceleration signal or a braking signal when a driver operates the electronic pedal apparatus, the electronic pedal apparatus being configured to enable the driver to operate the electronic pedal apparatus with a small effort and to easily identify an operation situation because a rectilinear movement and a rotation occur even though a pad is finely displaced when the driver operates the electronic pedal apparatus, which makes it possible to reduce a degree of fatigue of the driver.

The present disclosure also aims to provide an electronic pedal apparatus in which an acceleration function and a braking function are integrated, which makes it possible to reduce the number of components and costs.

The present disclosure also aims to provide an electronic pedal apparatus in which a movement direction of a pad at the time of generating an acceleration signal is different from a movement direction of the pad at the time of generating a braking signal, which makes it possible to improve recognition performance related to an operation of the pad and prevent an erroneous operation.

To achieve the above-mentioned objects, various aspects of the present disclosure are directed to providing an electronic pedal apparatus including: a main housing including a pad guide extending forward and rearward of the main housing; a pad provided to slidably contact with the pad guide and configured to move forward or rearward along the pad guide in a response that a driver operates the pad; and a sensor portion provided on the main housing and the pad and configured to generate an acceleration signal or a braking signal for a vehicle in a response that the pad moves in the forward and rearward direction.

The pad guide may be provided as first and second guides protruding upward and extending forward and rearward from first and second sides of the main housing, the pad may have guide insertion grooves formed at positions corresponding to the first and second pad guides, and the pad guides may be inserted and provided in the guide insertion grooves.

The main housing may be positioned at a lower side of a footrest panel and hidden therefrom, and the pad guide may protrude toward an upper side of the footrest panel and be inserted and provided in the guide insertion groove of the pad.

A pad protrusion may be formed at a portion of the guide insertion groove based on a forward/rearward direction, the pad protrusion may be in contact with the pad guide, and the pad protrusion may move forward or rearward along the pad guide while kept in line contact with the pad guide in response that the pad moves in the forward and rearward direction.

The pad guide may have one or more depressed portions in which the pad protrusion is selectively accommodated, and when the pad protrusion is accommodated in the depressed portion, a position of the pad may be fixed at a middle position of the pad guide based on the forward and rearward direction of the pad guide.

The pad guide may have a shape of an arc including a rotation radius that increases from a middle position to first and second opposite end portions thereof in a forward/rearward direction thereof.

The pad may have a pad protrusion configured to be in line contact with the pad guide, and when the driver operates the pad, the pad protrusion may rotate while rectilinearly moving along the pad guide including the shape of the arc.

Two anti-withdrawal guides for preventing withdrawal of the driver's foot may be disposed on the pad and protrude upwards from left and right sides of the pad.

The electronic pedal apparatus may further include a plurality of return springs connecting the main housing and the pad and configured to return the pad to a middle position of the pad guide based on a longitudinal direction of the pad guide in a response that an operating force applied by the driver is eliminated from the pad.

The return springs may include: front return springs respectively positioned at corresponding front left and right sides of the main housing and the pad; and rear return springs respectively positioned at corresponding rear left and right sides of the main housing and the pad, and the front return springs and the rear return springs may move the pad, which has been moved forward or rearward thereof, to the middle position of the pad guide.

The sensor portion may include: an acceleration sensor configured to generate the acceleration signal for the vehicle when the pad moves in a first direction thereof; and a braking sensor configured to generate the braking signal for the vehicle when the pad moves in a second direction thereof.

The acceleration sensor may include a first magnet and a first PCB respectively fixed to the pad and the main housing at a front position based on a middle position in a longitudinal direction of the pad guide, and the first PCB may generate the acceleration signal of the vehicle by recognizing a change in magnetic flux of the first magnet when the pad moves forward thereof.

The braking sensor may include a second magnet and a second PCB respectively fixed to the pad and the main housing at a rear position based on the middle position in the longitudinal direction of the pad guide, and the second PCB may generate the braking signal of the vehicle by recognizing a change in magnetic flux of the second magnet when the pad moves rearward thereof.

The first PCB and the second PCB may be configured as a single PCB.

An initial magnetic flux state in which the magnetic flux of the acceleration sensor and the magnetic flux of the braking sensor are identical to each other may be maintained in a state in which the driver does not operate the pad, the magnetic flux of the acceleration sensor may increase and the magnetic flux of the braking sensor may decrease based on the initial magnetic flux state in a response that the driver moves the pad forward and performs an acceleration operation, and the magnetic flux of the acceleration sensor may decrease and the magnetic flux of the braking sensor may increase based on the initial magnetic flux state in a response that the driver moves the pad rearward and performs a braking operation.

An error of a pedal signal may be determined when the magnetic flux of the acceleration sensor and the magnetic flux of the braking sensor simultaneously increase or decrease based on the initial magnetic flux state when the driver performs the acceleration operation or the braking operation by moving the pad forward or rearward thereof.

The acceleration signal or the braking signal for the vehicle may be generated in a response that the driver operates the single pad forward or rearward thereof.

A full stroke in an acceleration direction may be restricted when the pad moves forward and a front portion of the pad comes into contact with the main housing.

A full stroke in a braking direction may be restricted when the pad moves rearward and a rear portion of the pad comes into contact with the main housing.

Furthermore, various aspects of the present disclosure are directed to providing an electronic pedal apparatus including: a main housing including a pad guide including a shape of an arc and extending forward and rearward thereof; a pad provided to slidably contact with the pad guide and configured to rotate and move forward or rearward while kept in contact with the pad guide including a shape of an arc in a response that a driver operates the pad; and a sensor portion including: an acceleration sensor configured to generate an acceleration signal for a vehicle when the pad moves while rotating forward along the pad guide including an arc shape; and a braking sensor configured to generate a braking signal for the vehicle when the pad moves while rotating rearward thereof.

According to the electronic pedal apparatus according to an exemplary embodiment of the present disclosure, when the driver operates the pad, the pad rectilinearly moves and rotates along the pad guides while being kept in line contact with the pad guides each including an arc shape. Therefore, the driver may operate the pad with a small effort and easily identify an operation situation because the rectilinear movement and the rotation occur even though the pad is finely displaced when the driver operates the pad. Therefore, it is possible to reduce a degree of fatigue of the driver.

Furthermore, according to the electronic pedal apparatus according to an exemplary embodiment of the present disclosure, the acceleration function and the braking function are integrated, which makes it possible to reduce the number of components and costs.

Furthermore, according to the electronic pedal apparatus according to an exemplary embodiment of the present disclosure, the movement direction of the pad at the time of generating the acceleration signal is different from the movement direction of the pad at the time of generating the braking signal, which makes it possible to improve recognition performance related to the operation of the pad and prevent an erroneous operation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably to facilitate the description, but the suffixes themselves do not have distinguishable meanings or functions.

In the detailed description included in the present specification, the specific descriptions of publicly known related technologies will be omitted when it is determined that the specific descriptions may obscure the subject matter of the exemplary embodiments included in the present specification.

Furthermore, it should be understood that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is referred to as being "coupled" or "connected" to another constituent element, it should be understood that one constituent element may be coupled or directly connected to another constituent element, and an intervening constituent element can also be present between the constituent elements.

When one constituent element is referred to as being "directly coupled to" or "directly connected to" another constituent element, it may be understood that no intervening constituent element is present between the constituent elements.

Singular expressions include plural expressions unless clearly referred to as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term "control unit" or "unit" including "motor control unit (MCU)" or "hybrid control unit (HCU)" is merely a term widely used to name a control device (controller or control unit) for controlling a particular vehicle function but does not mean a generic function unit.

The control unit (controller) may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, an electronic pedal apparatus according to various exemplary embodiments of the present disclosure will be described with reference to the accompanying drawings.

As illustrated in FIGS. 1 to 10, an electronic pedal apparatus according to various exemplary embodiments of the present disclosure may include a main housing 100 including pad guides 110 extending forward and rearward thereof; a pad 200 provided to be in contact with the pad guide 110 and configured to be moved forward or rearward along the pad guide 110 by operation of a driver; and a sensor portion 300 provided on the main housing 100 and the pad 200 and configured to generate an acceleration signal or a braking signal for a vehicle when the pad 200 moves forward or rearward thereof.

The main housing 100 is provided to be positioned on a footrest panel 10 positioned in a lower space of a driver seat.

The pad guides 110 are provided as two pad guides 110. The two pad guides 110 respectively protrude upward and extend forward and rearward from left and right sides of the main housing 100.

The pad guide 110 may be integrated with the main housing 100. Alternatively, the pad guide 110 may be manufactured as a separate component and then fixedly coupled to the main housing 100.

The driver may operate the pad 200 by putting his or her foot 20 on the pad 200 and then pushing the foot 20 forward or pull the foot 20 rearward thereof.

A signal related to an acceleration function of the vehicle is generated when the pad 200 is moved forward by operation of the driver in the state in which the pad 200 is in contact with the pad guide 110. On the other hand, a signal related to a braking function of the vehicle is generated when the pad 200 is moved rearward by operation of the driver in the state in which the pad 200 is in contact with the pad guide 110.

Therefore, according to the exemplary embodiment of the present disclosure, movement directions of the pad 200 for accelerating and braking the vehicle are different from each other. Therefore, it is possible to improve performance in recognizing the operation of the pad 200, prevent an erroneous operation, and improve safety associated with the operation of the pad.

The pad 200 has guide insertion grooves 210 formed at positions corresponding to the two pad guides 110, and the pad guides 110 are inserted and provided into the guide insertion grooves 210. Therefore, an assembly of the main housing 100 and the pad 200 may be compact in size.

The main housing 100 is positioned at a lower side of the footrest panel 10 and provided to be hidden. Therefore, most portion of the main housing 100 may be covered by the footrest panel 10, which makes it possible to improve an external aesthetic appearance.

The pad guides 110 protrude toward an upper side of the footrest panel 10 through a panel hole 11 formed in the footrest panel 10, and the pad guides 110 protruding toward the upper side of the footrest panel 10 are inserted into the guide insertion grooves 210 of the pad 200. Therefore, an interval C between the pad 200 and the footrest panel 10 may be maximally decreased, which makes it possible to significantly reduce an overall size of the pedal apparatus.

The pad 200 has pad protrusions 220, and the pad protrusions 220 are formed at positions in the guide insertion grooves 210 based on a forward/rearward direction thereof. The pad protrusion 220 is in line contact with the pad guide 110. When the pad 200 moves forward or rearward thereof, the pad protrusions 220 move forward or rearward along the pad guides 110 in the state in which the pad protrusions 220 are in line contact with the pad guides 110.

The contact between the pad protrusions 220 and the pad guides 110 allows the pad 200 to move forward or rearward in a more stable posture. The line contact between the pad protrusions 220 and the pad guides 110 may minimize contact friction, facilitating the pad 200 to move more smoothly.

The pad guide 110 has one or more depressed portions 120 in which the pad protrusion 220 is accommodated. When the pad protrusion 220 is accommodated in the depressed portion 120, a position of the pad 200 is fixed at a middle position based on the forward and rearward direction of the pad guide 110. In the instant case, the acceleration signal or the braking signal is not generated.

The pad protrusion 220 is inserted and accommodated in the depressed portion 120 when the driver does not operate the pad 200 so that the depressed portion 120 is configured to control an initial position of the pad 200.

The depressed portions 120 may be formed at one or more positions in the pad guide 110. The depressed portions 120 may be formed at a front position, a rear position, or the front and rear positions based on a longitudinal direction of the pad guide 110.

The pad guide 110 has an arc or elliptical shape including a rotation radius that gradually increases from the middle position to two opposite end portions in the forward and rearward direction thereof. Therefore, when the driver operates the pad 200, the pad protrusions 220, which are in line contact with the pad guides 110, rotate while rectilinearly moving along the pad guides 110 each including an arc shape.

Therefore, the driver may operate the pad 200 with a small effort and easily identify an operation situation because the rectilinear movement and the rotation occur even though the pad 200 is finely displaced. It is possible to reduce a degree of fatigue of the driver.

Two anti-withdrawal guides 230 for preventing withdrawal of the driver's foot 20 are disposed on the pad 200 and protrude upwards from the left and right sides of the pad 200. Therefore, the driver may easily operate the pad 200 in a more stable state.

The electronic pedal apparatus according to the exemplary embodiment of the present disclosure includes a plurality of return springs 400 configured to connect the main housing 100 and the pad 200 and return the pad 200 to a middle position based on the longitudinal direction of the pad guide 110 when an operating force applied by the driver is eliminated from the pad 200.

A middle portion of the return spring 400 based on a longitudinal direction thereof is wound circularly multiple times, and two opposite end portions of the return spring 400 are respectively fixed on the main housing 100 and the pad 200. To the present end, spring catching portions 130 and 240 are respectively provided on the main housing 100 and the pad 200.

The return springs 400 include two front return springs 410 and two rear return springs 420. The two front return springs 410 are respectively positioned at front left and right sides of the main housing 100 and the pad 200, one return spring for each side thereof. The two rear return springs 420 are respectively positioned at rear left and right sides of the main housing 100 and the pad 200, one return spring for each side thereof.

That is, the return springs 400 may be provided as a total of four springs including a combination of the two front return springs 410 and the two rear return springs 420 and more stably return the pad 200.

The sensor portion 300 includes: an acceleration sensor 310 configured to generate an acceleration signal for the vehicle when the pad 200 moves forward thereof; and a braking sensor 320 configured to generate a braking signal for the vehicle when the pad 200 moves rearward thereof.

The acceleration sensor 310 includes a first magnet 311 and a first printed circuit board (PCB) 312 respectively fixed to the pad 200 and the main housing 100 at a front position based on a middle position based on the longitudinal direction of the pad guide 110. The first PCB 312 generates a signal related to the acceleration function of the vehicle by recognizing a change in magnetic flux of the first magnet 311 when the pad 200 moves forward thereof.

The braking sensor 320 includes a second magnet 321 and a second PCB 322 respectively fixed to the pad 200 and the main housing 100 at a rear position based on the middle position based on the longitudinal direction of the pad guide 110. The second PCB 322 generates a signal related to the braking function of the vehicle by recognizing a change in magnetic flux of the second magnet 321 when the pad 200 moves rearward thereof.

The first PCB 312 and the second PCB 322 each include a Hall sensor configured for recognizing a magnet. The first PCB 312 and the second PCB 322 may be configured as a single PCB and designed to be compact in size.

Figure 1:
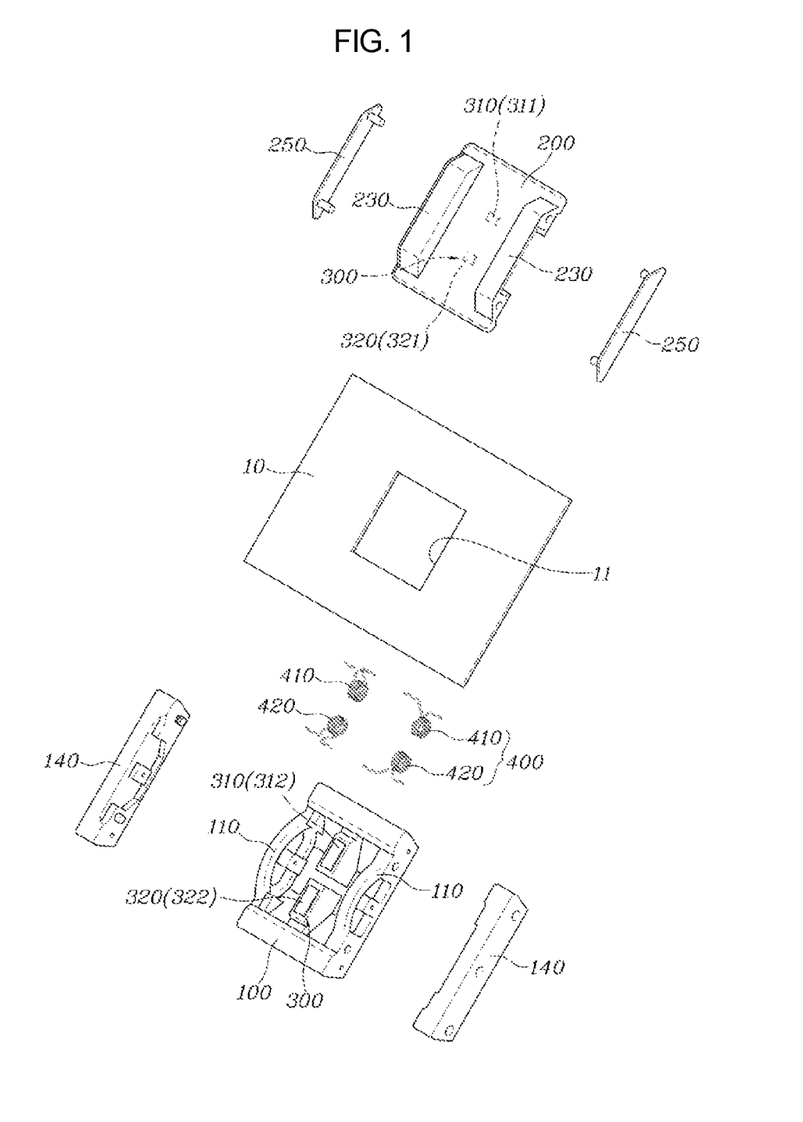
FIG. 1 is an exploded view of an electronic pedal apparatus according to an exemplary embodiment of the present disclosure.
Figure 2:
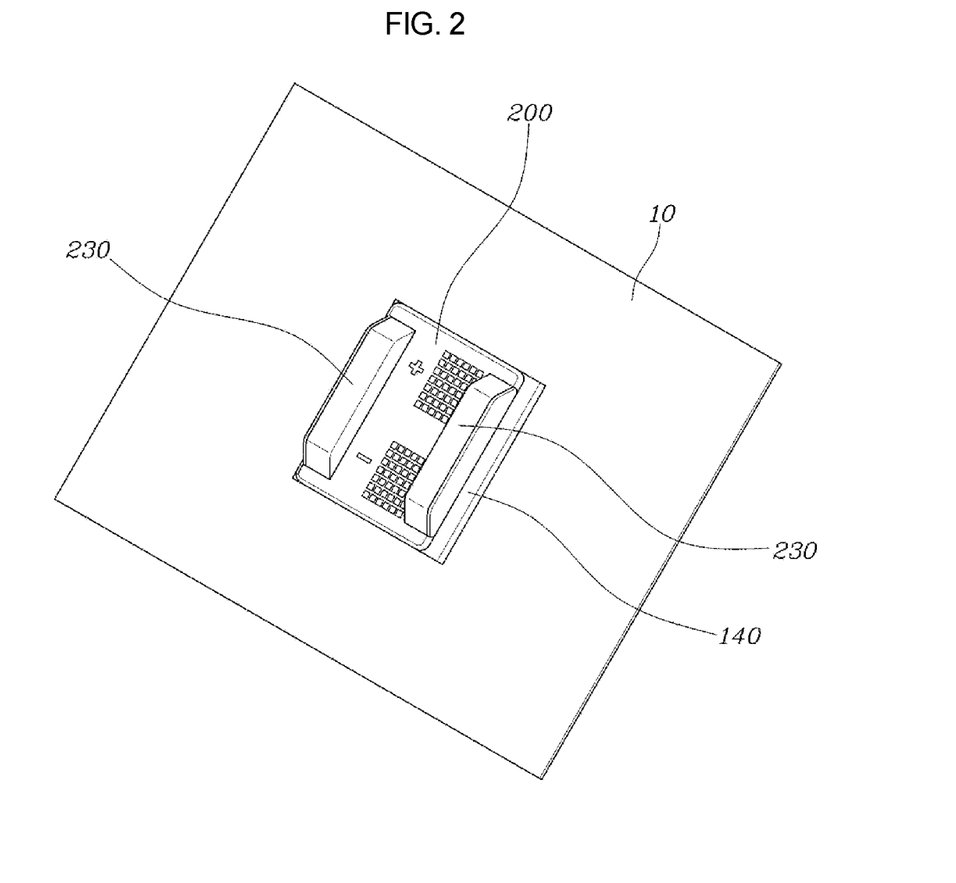
FIG. 2 is a view exemplarily illustrating a coupled state of the electronic pedal apparatus in FIG. 1.
Figure 3:
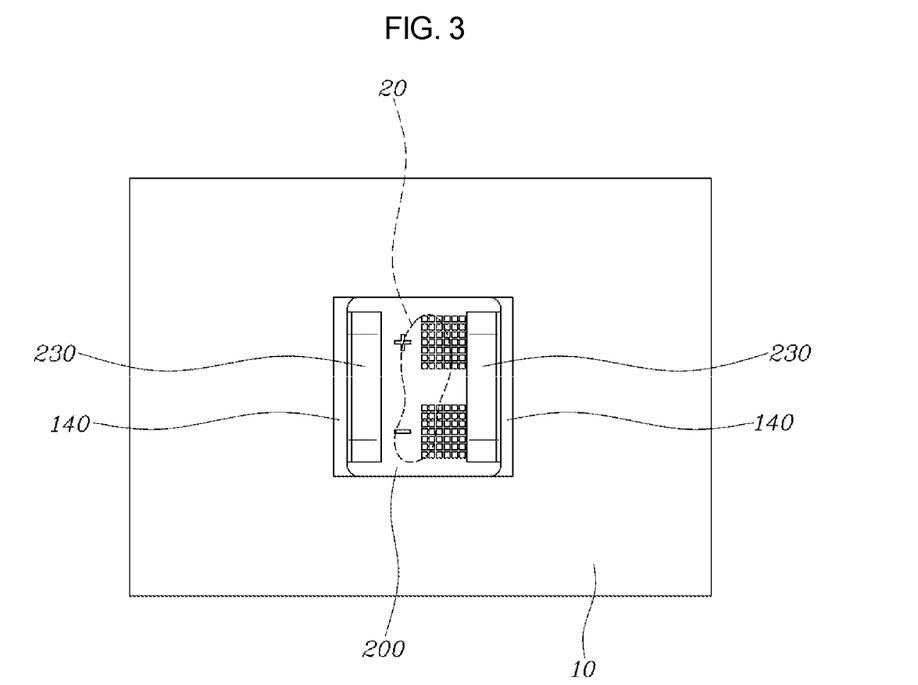
FIG. 3 is a front view of FIG. 2.
Figure 4:
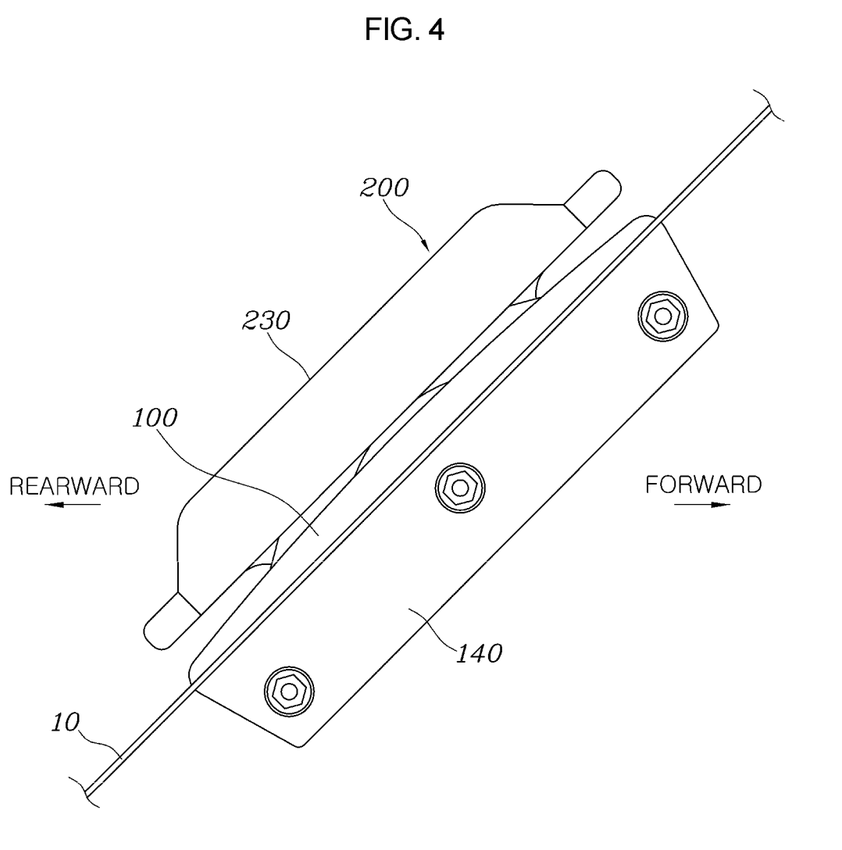
FIG. 4 is a side view of FIG. 3.
Figure 5:
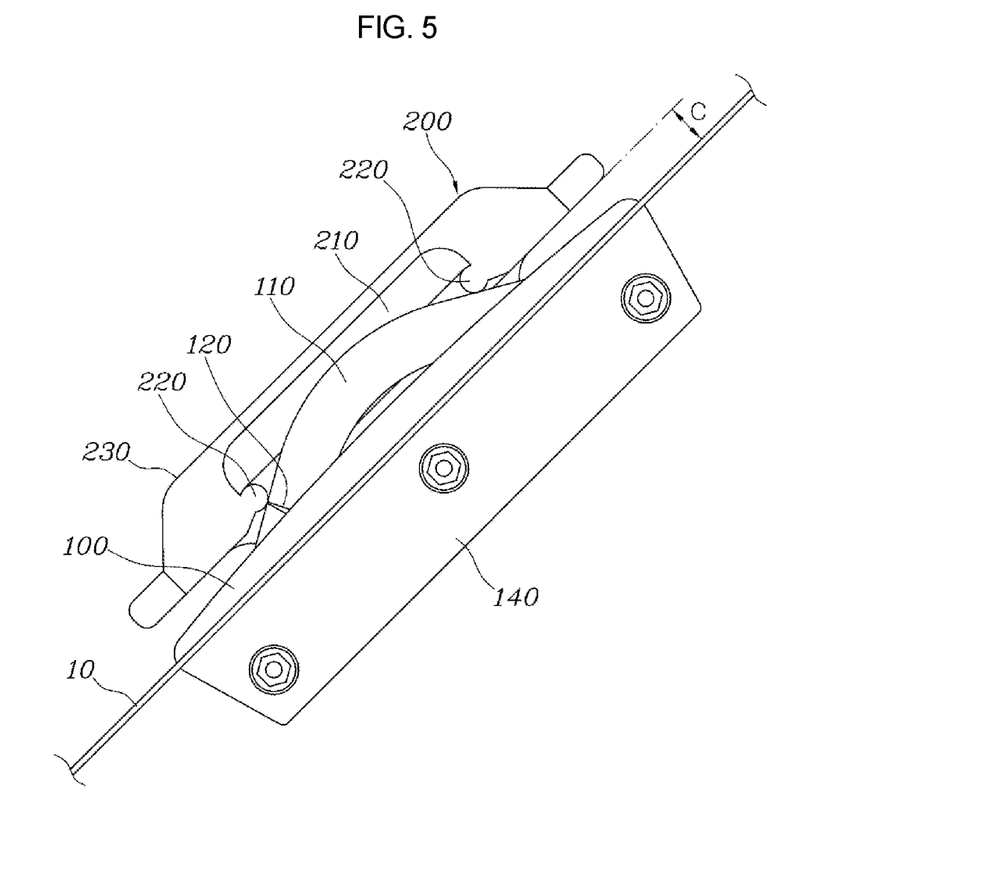
FIG. 5 is a view exemplarily illustrating a state in which a pad in FIG. 4 is cut out.
Figure 6:
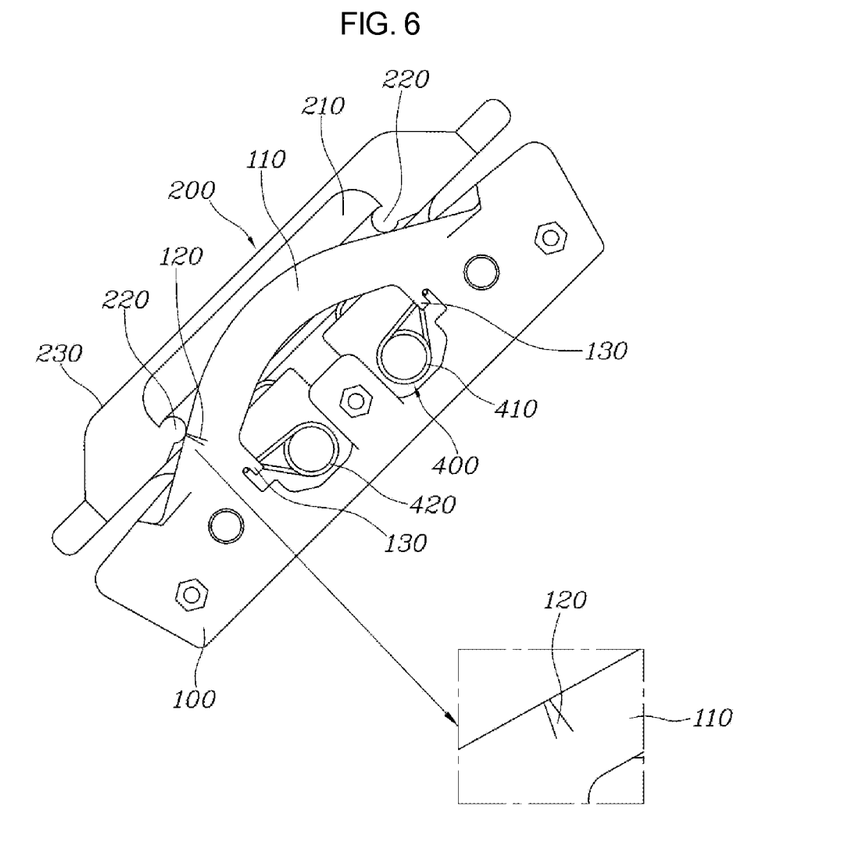
FIG. 6 is a view exemplarily illustrating a state in which a main housing in FIG. 5 is cut out.
Figure 7:
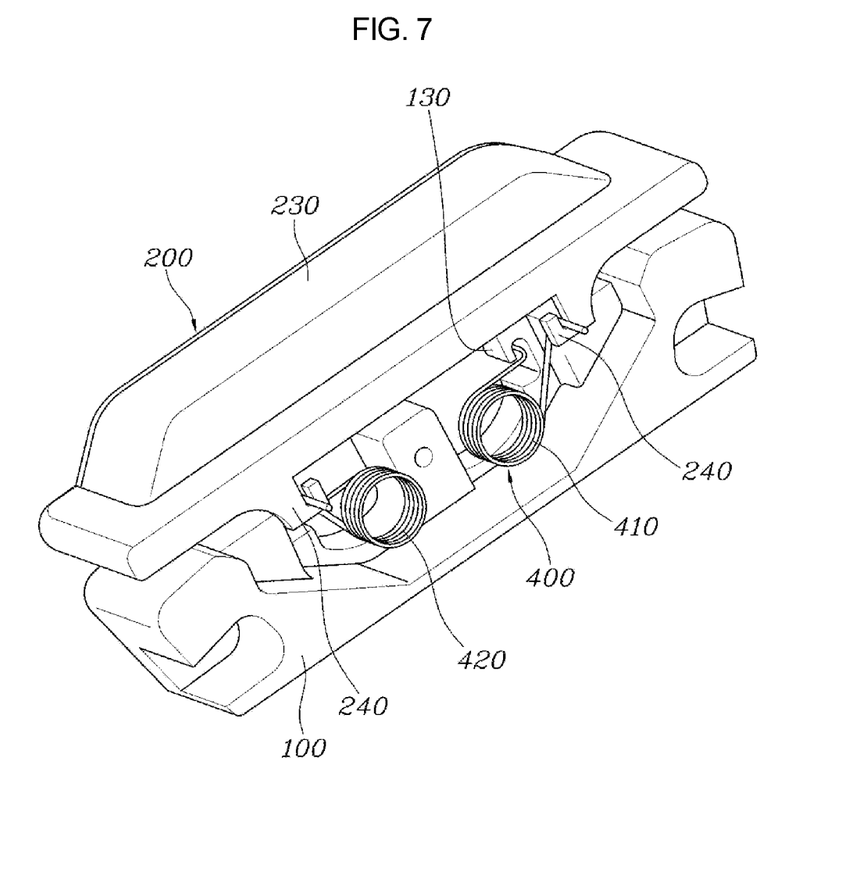
FIG. 7 is a view of an installation structure of a return spring according to an exemplary embodiment of the present disclosure.
Figure 8:
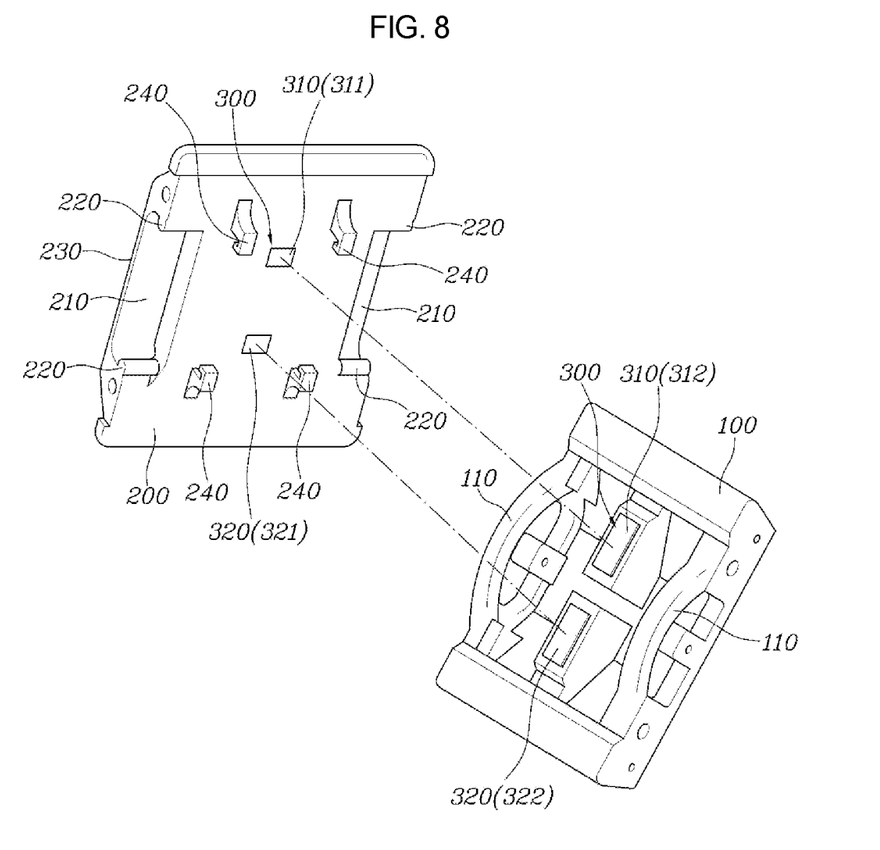
FIG. 8 is a view of a sensor part according to an exemplary embodiment of the present disclosure.

As illustrated in FIG. 6, in a state in which the driver does not operate the pad 200, the pad 200 is fixed at the middle position based on the longitudinal direction of the pad guide 110 by the return springs 400. In the instant case, the magnetic flux of the acceleration sensor 310 and the magnetic flux of the braking sensor 320 are identical to each other. The state in which the magnetic flux of the acceleration sensor 310 and the magnetic flux of the braking sensor 320 are identical to each other is defined as an initial magnetic flux state.

Figure 9:
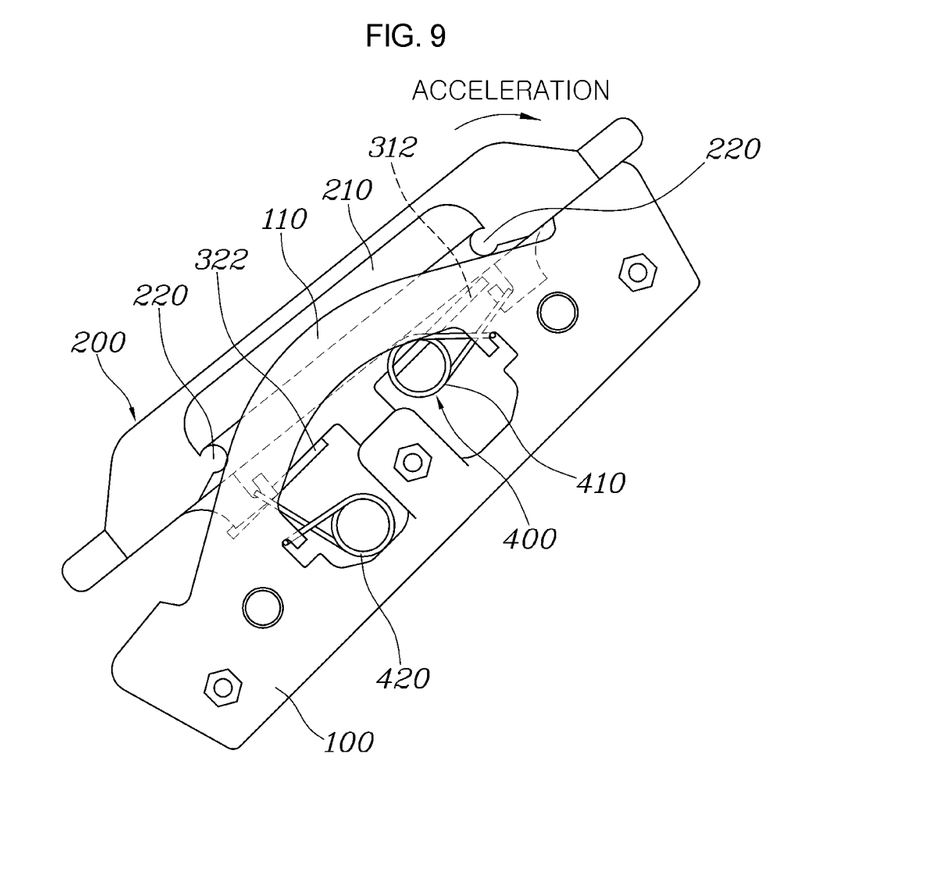
FIG. 9 and FIG. 10 are views exemplarily illustrating operating states of the pad according to an exemplary embodiment of the present disclosure in case of acceleration and braking.

As illustrated in FIG. 9, when the driver operates the pad 200 and moves the pad 200 forward, an acceleration operation is performed. When the acceleration operation is performed, the magnetic flux of the acceleration sensor 310 increases, whereas the magnetic flux of the braking sensor 320 decreases based on the initial magnetic flux state.

That is, during the acceleration operation of the pad 200, the magnetic flux of the acceleration sensor 310 increases as the first magnet 311 becomes close to the first PCB 312, whereas the magnetic flux of the braking sensor 320 decreases as the second magnet 321 becomes distant from the second PCB 322.

Figure 10:
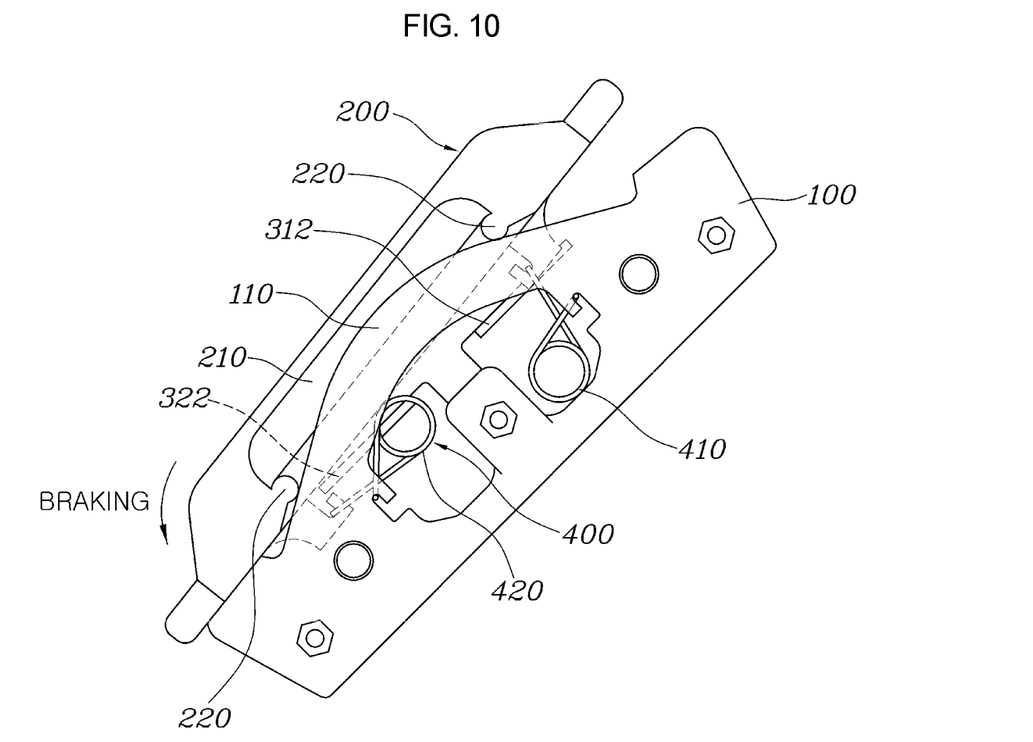

As illustrated in FIG. 10, when the driver operates the pad 200 and moves the pad 200 rearward thereof, a braking operation is performed. When the braking operation is performed, the magnetic flux of the acceleration sensor 310 decreases, whereas the magnetic flux of the braking sensor 320 increases based on the initial magnetic flux state.

That is, during the braking operation of the pad 200, the magnetic flux of the acceleration sensor 310 decreases as the first magnet 311 becomes distant from the first PCB 312, whereas the magnetic flux of the braking sensor 320 increases as the second magnet 321 becomes close to the second PCB 322.

Furthermore, in case that the magnetic flux of the acceleration sensor 310 and the magnetic flux of the braking sensor 320 simultaneously increase or decrease based on the initial magnetic flux state when the driver performs the acceleration operation or the braking operation by moving the pad 200 forward or rearward thereof, an error of a pedal signal is determined. In the instant case, the acceleration signal or the braking signal is not generated, preventing malfunction.

The exemplary embodiment of the present disclosure is characterized in that the acceleration signal or the braking signal for the vehicle is generated when the driver operates the single pad 200 forward or rearward thereof. As illustrated in FIG. 9, when the pad 200 moves forward and a front portion of the pad 200 comes into contact with the main housing 100, a full stroke in an acceleration direction is restricted. As illustrated in FIG. 10, when the pad 200 moves rearward and a rear portion of the pad 200 comes into contact with the main housing 100, a full stroke in a braking direction is restricted.

Meanwhile, housing covers 140 may be respectively coupled to the left and right sides of the main housing 100 to improve an external aesthetic appearance, and pad covers 250 may also respectively coupled to the left and right sides of the pad 200 to improve an external aesthetic appearance.

The electronic pedal apparatus according to various exemplary embodiments of the present disclosure may include the main housing 100 including the pad guides 110 each including a shape of an arc and extending forward and rearward thereof; the pad 200 provided to be in contact with the pad guide 110 and configured to rotate and move forward or rearward while being kept in contact with the pad guides 110 each including a shape of an arc when the driver operates the pad 200; and the sensor portion 300 including the acceleration sensor 310 configured to generate the acceleration signal for the vehicle when the pad 200 moves while rotating forward along the pad guides 110 each including an arc shape, and the braking sensor 320 configured to generate the braking signal for the vehicle when the pad 200 moves while rotating rearward thereof.

According to the electronic pedal apparatus according to an exemplary embodiment of the present disclosure described above, when the driver operates the pad 200, the pad 200 rectilinearly moves and rotates along the pad guides 110 while being kept in line contact with the pad guides 110 each including an arc shape. Therefore, the driver may operate the pad 200 with a small effort and easily identify an operation situation because the rectilinear movement and the rotation occur even though the pad 200 is finely displaced when the driver operates the pad 200. Therefore, it is possible to reduce a degree of fatigue of the driver.

Furthermore, according to the electronic pedal apparatus according to an exemplary embodiment of the present disclosure, the acceleration function and the braking function are integrated, which makes it possible to reduce the number of components and costs.

Furthermore, according to the electronic pedal apparatus according to an exemplary embodiment of the present disclosure, the movement direction of the pad 200 at the time of generating the acceleration signal is different from the movement direction of the pad 200 at the time of generating the braking signal, which makes it possible to improve recognition performance related to the operation of the pad 200 and prevent an erroneous operation.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic pedal apparatus comprising:
    a main housing including a pad guide extending in a first direction and a second direction of the main housing;
    a pad provided to slidably contact with the pad guide and configured to move in the first direction and the second direction along the pad guide in a response that a driver operates the pad;
    a sensor portion provided on the main housing and the pad and configured to generate an acceleration signal or a braking signal for a vehicle in a response that the pad moves in the first direction and the second direction; and
    a plurality of return springs connecting the main housing and the pad and configured to return the pad to a middle position of the pad guide in a longitudinal direction of the pad guide in a response that an operating force applied by the driver is eliminated from the pad.

2. The electronic pedal apparatus of claim 1,
    wherein the pad guide includes first and second pad guides protruding upward and extending in the first direction and the second direction from first and second sides of the main housing, and
    wherein the pad includes guide insertion grooves formed at positions corresponding to the first and second pad guides, and the first and second pad guides are inserted and provided in the guide insertion grooves.

3. The electronic pedal apparatus of claim 2, wherein the main housing is positioned at a lower side of a footrest panel and hidden therefrom, and the first and second pad guides protrude toward an upper side of the footrest panel and is inserted and provided in the guide insertion grooves of the pad.

4. The electronic pedal apparatus of claim 2, wherein a pad protrusion is formed at a portion of the guide insertion grooves in the first direction and the second direction of the pad, the pad protrusion is in contact with the pad guide, and the pad protrusion moves in the first direction or in the second direction along the pad guide while kept in line contact with the pad guide in response that the pad moves in the first direction and the second direction.

5. The electronic pedal apparatus of claim 4,
    wherein the pad guide includes one or more depressed portions in which the pad protrusion is selectively accommodated, and
    wherein when the pad protrusion is accommodated in the depressed portion, a position of the pad is fixed at the middle position of the pad guide based on the first direction and the second direction of the pad guide.

6. The electronic pedal apparatus of claim 1, wherein the pad guide includes a shape of an arc including a rotation radius that increases from the middle position to first and second opposite end portions thereof in the first direction and the second direction.

7. The electronic pedal apparatus of claim 6,
    wherein the pad includes a pad protrusion configured to be in line contact with the pad guide, and
    wherein, in response that the driver operates the pad, the pad protrusion rotates while rectilinearly moving along the pad guide including the shape of the arc.

8. The electronic pedal apparatus of claim 1, wherein first and second anti-withdrawal guides for preventing withdrawal of the driver's foot are disposed on the pad and protrude upwards from first and second sides of the pad.

9. The electronic pedal apparatus of claim 1, wherein the return springs include:
    front return springs respectively positioned at corresponding front left and right sides of the main housing and the pad; and
    rear return springs respectively positioned at corresponding rear left and right sides of the main housing and the pad, and
    wherein the front return springs and the rear return springs move the pad, which has been moved in the first direction or the second direction, to the middle position of the pad guide.

10. The electronic pedal apparatus of claim 1, wherein the sensor portion includes:
an acceleration sensor configured to generate the acceleration signal for the vehicle when the pad moves in the first direction; and
a braking sensor configured to generate the braking signal for the vehicle when the pad moves in the second direction.

11. The electronic pedal apparatus of claim 10,
wherein the acceleration sensor includes a first magnet and a first PCB respectively fixed to the pad and the main housing at a front position based on the middle position in a longitudinal direction of the pad guide, and
wherein the first PCB is configured to generate the acceleration signal of the vehicle by recognizing a change in magnetic flux of the first magnet when the pad moves in the first direction.

12. The electronic pedal apparatus of claim 11,
wherein the braking sensor includes a second magnet and a second PCB respectively fixed to the pad and the main housing at a rear position based on the middle position in the longitudinal direction of the pad guide, and
wherein the second PCB is configured to generate the braking signal of the vehicle by recognizing a change in magnetic flux of the second magnet when the pad moves in the second direction.

13. The electronic pedal apparatus of claim 12, wherein the first PCB and the second PCB are configured as a single PCB.

14. The electronic pedal apparatus of claim 12,
wherein an initial magnetic flux state in which the magnetic flux of the acceleration sensor and the magnetic flux of the braking sensor are identical to each other is maintained in a state in which the driver does not operate the pad,
wherein the magnetic flux of the acceleration sensor increases and the magnetic flux of the braking sensor decreases based on the initial magnetic flux state in a response that the driver moves the pad in the first direction and performs an acceleration operation, and
wherein the magnetic flux of the acceleration sensor decreases and the magnetic flux of the braking sensor increases based on the initial magnetic flux state in a response that the driver moves the pad in the second direction and performs a braking operation.

15. The electronic pedal apparatus of claim 14, wherein an error of a pedal signal is determined when the magnetic flux of the acceleration sensor and the magnetic flux of the braking sensor simultaneously increase or decrease based on the initial magnetic flux state when the driver performs the acceleration operation or the braking operation by moving the pad in the first direction or the second direction.

16. The electronic pedal apparatus of claim 1, wherein the acceleration signal or the braking signal for the vehicle is generated in a response that the driver operates the single pad in the first direction or the second direction.

17. The electronic pedal apparatus of claim 1, wherein a full stroke in an acceleration direction is restricted when the pad moves in the first direction and a front portion of the pad comes into contact with the main housing.

18. The electronic pedal apparatus of claim 1, wherein a full stroke in a braking direction is restricted when the pad moves in the second direction and a rear portion of the pad comes into contact with the main housing.

19. An electronic pedal apparatus comprising:
a main housing including a pad guide including a shape of an arc and extending in a first direction and a second direction thereof;
a pad provided to slidably contact with the pad guide and configured to rotate and move in the first direction or in the second direction while kept in contact with the pad guide including the shape of the arc in a response that a driver operates the pad; and
a sensor portion including an acceleration sensor configured to generate an acceleration signal for a vehicle when the pad moves while rotating in the first direction along the pad guide and a braking sensor configured to generate a braking signal for the vehicle when the pad moves while rotating in the second direction.

20. An electronic pedal apparatus comprising:
a main housing including a pad guide extending in a first direction and a second direction of the main housing;
a pad provided to slidably contact with the pad guide and configured to move in the first direction and the second direction along the pad guide in a response that a driver operates the pad; and
a sensor portion provided on the main housing and the pad and configured to generate an acceleration signal or a braking signal for a vehicle in a response that the pad moves in the first direction and the second direction,
wherein the pad guide includes first and second pad guides protruding upward and extending in the first direction and the second direction from first and second sides of the main housing, and
wherein the pad includes guide insertion grooves formed at positions corresponding to the first and second pad guides, and the first and second pad guides are inserted and provided in the guide insertion grooves.

* * * * *